United States Patent
Hiyoshi et al.

(10) Patent No.: US 9,307,294 B2
(45) Date of Patent: Apr. 5, 2016

(54) CONTENT DISPLAY DEVICE, TELEVISION RECEIVER, MENU SCREEN GENERATION METHOD, AND RECORDING MEDIUM

(71) Applicant: SHARP KABUSHIKI KAISHA, Osaka-shi, Osaka (JP)

(72) Inventors: Masayuki Hiyoshi, Osaka (JP); Takahiro Tsugi, Osaka (JP); Bin Wu, Osaka (JP); Keiichi Hasegawa, Osaka (JP); Masayoshi Kanbara, Osaka (JP); Shinya Nishina, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/384,558

(22) PCT Filed: Sep. 27, 2012

(86) PCT No.: PCT/JP2012/074977
§ 371 (c)(1),
(2) Date: Sep. 11, 2014

(87) PCT Pub. No.: WO2013/136568
PCT Pub. Date: Sep. 19, 2013

(65) Prior Publication Data
US 2015/0033263 A1    Jan. 29, 2015

(30) Foreign Application Priority Data
Mar. 13, 2012  (JP) .................. 2012-056478
Sep. 18, 2012  (JP) .................. 2012-204994

(51) Int. Cl.
*G06F 3/00*  (2006.01)
*H04N 21/482*  (2011.01)
*G06F 3/0481*  (2013.01)
*G06F 3/0484*  (2013.01)
*H04N 21/431*  (2011.01)
*H04N 21/422*  (2011.01)

(52) U.S. Cl.
CPC .......... *H04N 21/482* (2013.01); *G06F 3/04815* (2013.01); *G06F 3/04842* (2013.01); *H04N 21/4221* (2013.01); *H04N 21/4312* (2013.01)

(58) Field of Classification Search
CPC .................. H04N 21/4221; H04N 21/482
USPC .......................................... 725/44
See application file for complete search history.

(56) References Cited

U.S. PATENT DOCUMENTS 7,095,402 B2 *  8/2006  Kunii et al. ............. 345/169
7,233,316 B2 *  6/2007  Smith et al. ............. 345/157
7,594,255 B2 *  9/2009  Yamamoto et al. ........ 725/153

(Continued)

FOREIGN PATENT DOCUMENTS

| JP | 2003-263148 A | 9/2003 |
| JP | 2007-34688 A  | 2/2007 |
| JP | 2007-183989 A | 7/2007 |

*Primary Examiner* — Nasser Goodarzi
*Assistant Examiner* — Michael B Pierorazio
(74) *Attorney, Agent, or Firm* — Birch, Stewart, Kolasch & Birch, LLP

(57) ABSTRACT

In response to a user's operation, a menu screen generating section (12) changes a menu screen to be generated (i) from a first menu screen (M1) in which thumbnail images (Ta through Tg) corresponding to respective plurality of pieces of content are linearly arranged (ii) to a second menu screen (M2) in which the thumbnail images (Ta through Tg) are circularly arranged.

10 Claims, 10 Drawing Sheets

(56) References Cited

U.S. PATENT DOCUMENTS

| | | | |
|---|---|---|---|
| 7,836,475 B2* | 11/2010 | Angiolillo et al. | 725/93 |
| 8,973,050 B2* | 3/2015 | Mohammed et al. | 725/52 |
| 2003/0169286 A1* | 9/2003 | Misawa | 345/716 |
| 2004/0164973 A1* | 8/2004 | Nakano et al. | 345/184 |
| 2005/0010955 A1* | 1/2005 | Elia et al. | 725/88 |
| 2005/0192924 A1* | 9/2005 | Drucker et al. | 707/1 |
| 2007/0028269 A1 | 2/2007 | Nezu et al. | |
| 2007/0199040 A1* | 8/2007 | Kates | 725/134 |
| 2010/0141851 A1* | 6/2010 | Kendall | 348/734 |
| 2011/0179451 A1* | 7/2011 | Miles et al. | 725/42 |
| 2011/0179453 A1* | 7/2011 | Poniatowski | 725/58 |
| 2012/0110235 A1* | 5/2012 | Hsieh et al. | 710/316 |
| 2012/0246683 A1* | 9/2012 | Mohammed et al. | 725/52 |
| 2013/0111347 A1* | 5/2013 | Reilly et al. | 715/716 |
| 2013/0276030 A1* | 10/2013 | Fujimoto | 725/40 |

* cited by examiner

CONTENT DISPLAY DEVICE, TELEVISION RECEIVER, MENU SCREEN GENERATION METHOD, AND RECORDING MEDIUM

TECHNICAL FIELD

The present invention relates to a content display device which displays content, and a menu screen generating method of generating a menu screen in the content display device. The present invention also relates to a television receiver that includes the content display device, a program for causing a computer to operate as the content display device, and a storage medium in which the program is stored.

BACKGROUND ART

Recently, sources which supply content to television receivers have been remarkably diversified. Recent television receivers are configured to display not only content which is supplied from (1) broadcasting sources such as terrestrial digital broadcasting, CS broadcasting, and BS (Broadcasting Satellite) but also content which is supplied from (2) communication sources such as IPTV (Internet Protocol TeleVision) and VOD (Video On Demand), (3) medium sources such as a hard disk drive and an optical disk drive, and (4) application sources such as web browser and a USB application. Note here that the USB application means an application for reproducing content stored in a USB memory.

In such a circumstance where the sources have been diversified, it is important to allow a user to efficiently select content to be displayed from content supplied from each source. A technique is employed which supports such user's selection of content by displaying a menu screen in which icon images, thumbnail images, etc. corresponding to respective sources are arranged.

Most menu screens to be displayed by television receivers are configured on basis of a configuration of a menu screen to be displayed by a personal computer, a digital camera, etc. For example, Patent Literature 1 discloses a digital still camera which displays a menu screen on which a user selects an image to be reproduced from stored images. Patent Literature 1 discloses, as an example configuration of the menu screen, (i) a menu screen in which thumbnail images are linearly arranged and (ii) a menu screen in which thumbnail images are circularly arranged.

CITATION LIST

Patent Literature

Patent Literature 1
Japanese Patent Application Publication, Tokukai, No. 2003-263148 (Publication Date: Sep. 19, 2003)

SUMMARY OF INVENTION

Technical Problem

In a case where thumbnail images are linearly arranged in a menu screen, a space for the linearly-arranged thumbnail images is a one-dimensional space. Therefore, increase in the number of thumbnail images to be selected makes it difficult to arrange all of the thumbnail images within the menu screen without deteriorating visibility of each of the thumbnail images. Moreover, in a case where, on a menu screen in which thumbnail images are linearly arranged, a thumbnail image on which a focus is placed is changed by shifting the thumbnail images in parallel to the linearly-arranged thumbnail images, it is difficult to notify a user of (i) a cycle of the thumbnail images (on which cycle the focus is placed on a final thumbnail image and an initial thumbnail image in this order) and (ii) complete display of the thumbnail images (all of the thumbnail images to be selected are displayed). In other words, the user has difficulty grasping all selectable content. This will cause the user to endlessly change the thumbnail image on which the focus is placed.

In a case where thumbnail images are circularly arranged in a menu screen, a space for the circularly-arranged thumbnail images is a two-dimensional space. Therefore, even in a case where the number of thumbnail images to be selected increases, it is possible to easily arrange all of the thumbnail images within the menu screen without deteriorating visibility of each of the thumbnail images. Moreover, in a case where, on a menu screen in which thumbnail images are circularly arranged, a thumbnail image on which a focus is placed is changed by circularly shifting the thumbnail images, it is possible to easily notify a user of a cycle of and complete display of the thumbnail images. In other words, the user can easily grasp all selectable content. This never causes the user to endlessly change the thumbnail image on which the focus is placed.

However, in the case where the thumbnail images are circularly arranged in the menu screen, a large area where the thumbnail images are circularly arranged is required.

The present invention was made in view of the problems, and an object of the present invention is to realize a menu screen (i) in which thumbnail images etc. do not keep occupying a large area and (ii) on which a user can easily grasp as appropriate all selectable content.

Solution to Problem

In order to attain the object, a content display device of the present invention is configured to display content and include menu screen generating means for generating a menu screen on which a user selects content to be displayed from a plurality of pieces of content, in response to a user's operation, the menu screen generating means changing the menu screen to be generated (i) from a first menu screen in which corresponding images corresponding to the respective plurality of pieces of content are linearly arranged (ii) to a second menu screen in which the corresponding images are circularly arranged.

In order to attain the object, a menu screen generating method of the present invention is configured to be a method of generating, in a content display device which is configured to display content, a menu screen on which a user selects content to be displayed from a plurality of pieces of content, the method including the step of changing, in response to a user's operation, the menu screen to be generated (i) from a first menu screen in which corresponding images corresponding to the respective plurality of pieces of content are linearly arranged (ii) to a second menu screen in which the corresponding images are circularly arranged.

Advantageous Effects of Invention

According to the present invention, it is possible to realize a menu screen (i) in which corresponding images do not keep occupying a large area and (ii) on which a user can easily grasp as appropriate all selectable content.

DESCRIPTION OF EMBODIMENTS

The following description will discuss, with reference to the drawings, a content display device in accordance with an embodiment of the present invention.

The content display device of the present embodiment is configured to display on a display section one piece of content selected by a user from a plurality of pieces of content which are supplied from respective different sources (the configuration will be later described). Note, however, that the present invention is not limited to this.

A plurality of pieces of content to be selected are not limited to those supplied from respective different sources. That is, the plurality of pieces of content to be selected may be supplied from a single source (for example, may be read from a single HD drive). The number of content to be selected by a user is not limited to one. That is, two or more pieces of content may be selected by a user. In this case, the two or more pieces of content selected by the user may be simultaneously or sequentially displayed on the display section.

[Configuration of Content Display Device]

Figure 1:
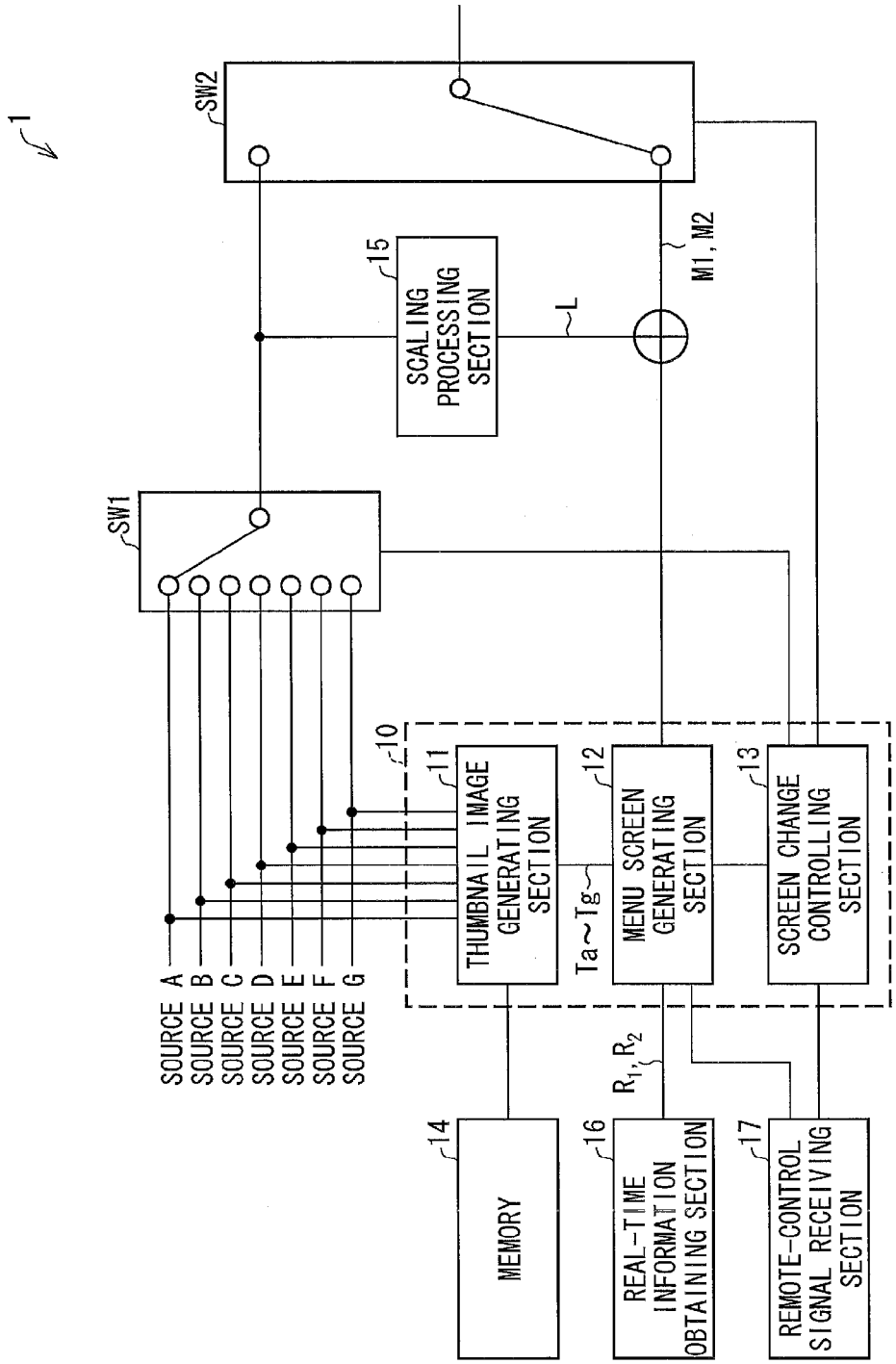
FIG. 1 is a block diagram illustrating a configuration of a content display device in accordance with an embodiment of the present invention.

The following description will discuss a configuration of a content display device 1 of the present embodiment with reference to FIG. 1. FIG. 1 is a block diagram illustrating the configuration of the content display device 1.

The content display device 1 has (1) a function of allowing a user to select M target source(s) (where M≥1, M=1 in the present embodiment) from N sources A through G (where N≥2, N=7 in the present embodiment) (note that N>M) and (2) a function of supplying, to a display section (not illustrated) incorporated in or connected to the content display device 1, content supplied from the M target source(s) selected by the user. The content display device 1 realizes these functions by a CPU 10, a memory 14, a scaling processing section 15, a real-time information obtaining section 16, a remote-control signal receiving section 17, a switch SW1, and a switch SW2 which are included in the content display device 1. Note here that the CPU 10 functions as a thumbnail image generating section 11, a menu screen generating section 12, and a screen change controlling section 13.

Examples of sources available as the sources A through G include (1) broadcasting sources such as terrestrial digital broadcasting, CS broadcasting, and BS (Broadcasting Satellite), (2) communication sources such as IPTV (Internet Protocol TeleVision) and VOD (Video On Demand), (3) medium sources such as a hard disk drive and an optical disk drive, and (4) application sources such as web browser, a USB application (an application for reproducing content stored in a USB memory), and a setting application (an application for allowing a user to set various parameters of an image quality, a sound quality, etc. of the content display device 1). It should be noted that the concept of "content" in this specification also includes a UI (User Interface) screen supplied from an application source.

The thumbnail image generating section 11 is means for generating thumbnail images Ta through Tg (see FIGS. 3 and 5) that are images (corresponding images) corresponding to the respective sources A through G.

For example, in a case where content to be supplied from the source A is a moving image, the thumbnail image generating section 11 generates (i) a thumbnail image Ta (still image) by extracting a one-frame image from the moving image and then downsizing the one-frame image to a predetermined size or (ii) a thumbnail image Ta (moving image) by downsizing the moving image to a predetermined size. In a case where the content to be supplied from the source A is a still image, the thumbnail image generating section 11 generates a thumbnail image Ta (still image) by downsizing the still image. Instead of generating a thumbnail image on the basis of content supplied from the source A, a predetermined image (still image or moving image) corresponding to the source A is read from the memory 14, and the read image itself or an image obtained by downsizing the read image to a predetermined size may be employed as a thumbnail image Ta. Thumbnail images Tb through Tg corresponding to the respective sources B through G may be generated in the same manner as the thumbnail image Ta corresponding to the source A.

Figure 5:
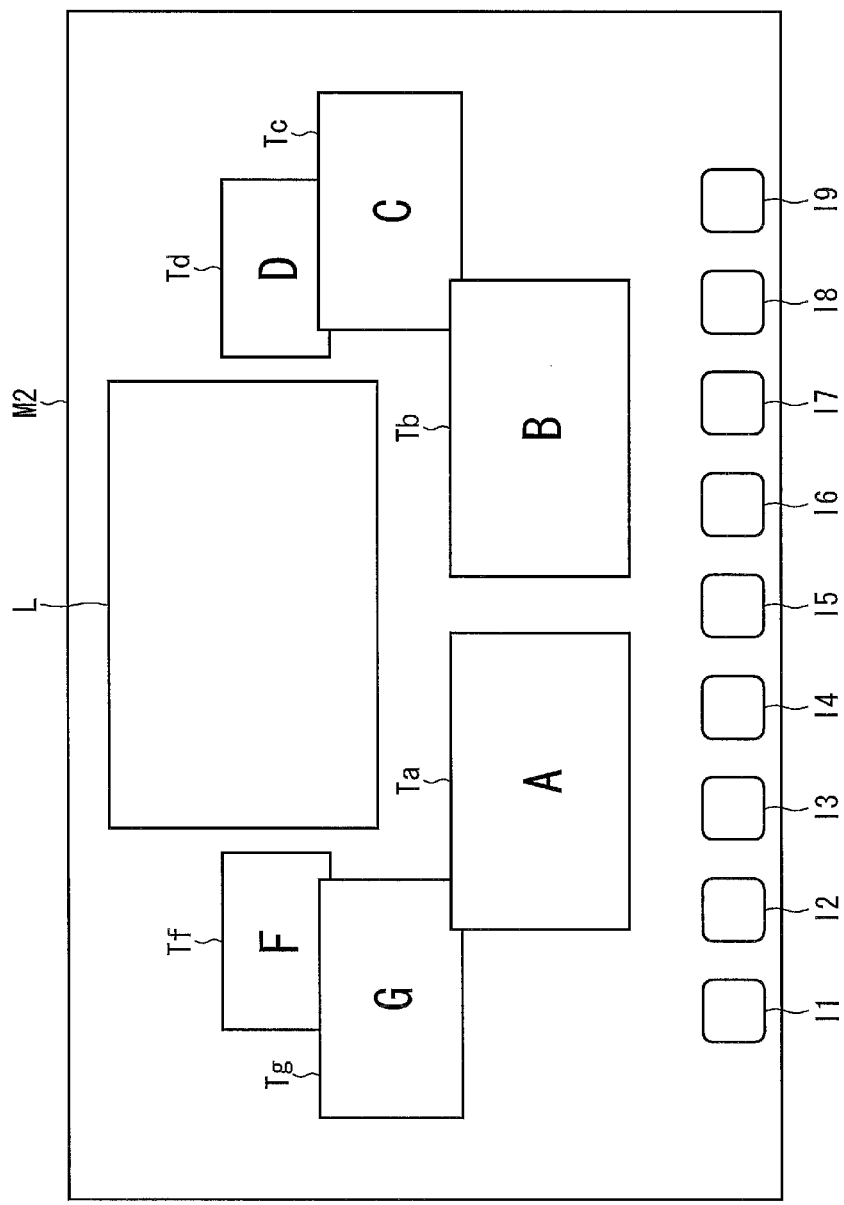
FIG. 5 is a view illustrating a configuration of a second menu screen generated by the content display device illustrated in FIG. 1.

The menu screen generating section 12 is means for generating a first menu screen M1 (see FIG. 3) and a second menu screen M2 (see FIG. 5). Each of the first menu screen M1 and the second menu screen M2 serves as a user interface via which a user selects one of the sources A through G.

The thumbnail images Ta through Tg generated by the thumbnail image generating section 11 are linearly arranged in the first menu screen M1, whereas the thumbnail images Ta through Tg generated by the thumbnail image generating section 11 are circularly arranged in the second menu screen M2 (as will be described in detail). A focus is placed on one of the thumbnail images Ta through Tg on the first menu screen M1. The menu screen generating section 12 notifies the screen change controlling section 13 of a source corresponding to the one of the thumbnail images Ta through Tg on which the focus is placed on the first menu screen M1.

The screen change controlling section 13 is means for controlling the switches SW1 and SW2 in accordance with a remote-control signal received by the remote-control signal receiving section 17. The switch SW1 selects one of the sources A through G as a target source. Content supplied from the selected target source is supplied via the switch SW1 to the switch SW2. The switch SW2 selects one of the switch SW1 and the menu screen generating section 12. In a case where the switch SW2 selects the switch SW1, the content supplied via the switch SW1 from the target source is supplied via the switch SW2 to the display section. In a case where the switch SW2 selects the menu screen generating section 12, data of first and second menu screens M1 and M2 generated by the menu screen generating section 12 is supplied via the switch SW2 to the display section. A change in screen by switching of the switches SW1 and SW2 will be described later with reference to another drawing.

The scaling processing section 15 is means for scaling up or down, to a predetermined size, content supplied from a target source selected by the switch SW1. Target content L that is content scaled up or down by the scaling processing section 15 is combined with a first menu screen M1 or a second menu screen M2. The combined target content L is displayed together with thumbnail images Ta through Tg on the display section.

The real-time information obtaining section 16 is means for obtaining real-time information. The real-time information obtaining section 16 obtains real-time information such as (i) time information indicative of a current time, (ii) weather information indicative of a current weather and/or a future weather, (iii) remaining battery life information indicative of a current remaining battery life, and (iv) radio wave intensity information indicative of a current radio wave intensity. The real-time information obtained by the real-time information obtaining section 16 is added to a first menu screen M1 generated by the menu screen generating section 12. The added real-time information is displayed together with thumbnail images Ta through Tg on the display section. Note that "real-time information" is not necessarily limited to instantaneous information but may be updated every few minutes or every few hours. That is, a cycle on which the real-time information is updated is not particularly limited provided that the real-time information is updated on a specific cycle.

[Change in Screen by Switching of Switches SW1 and SW2]

Figure 2:
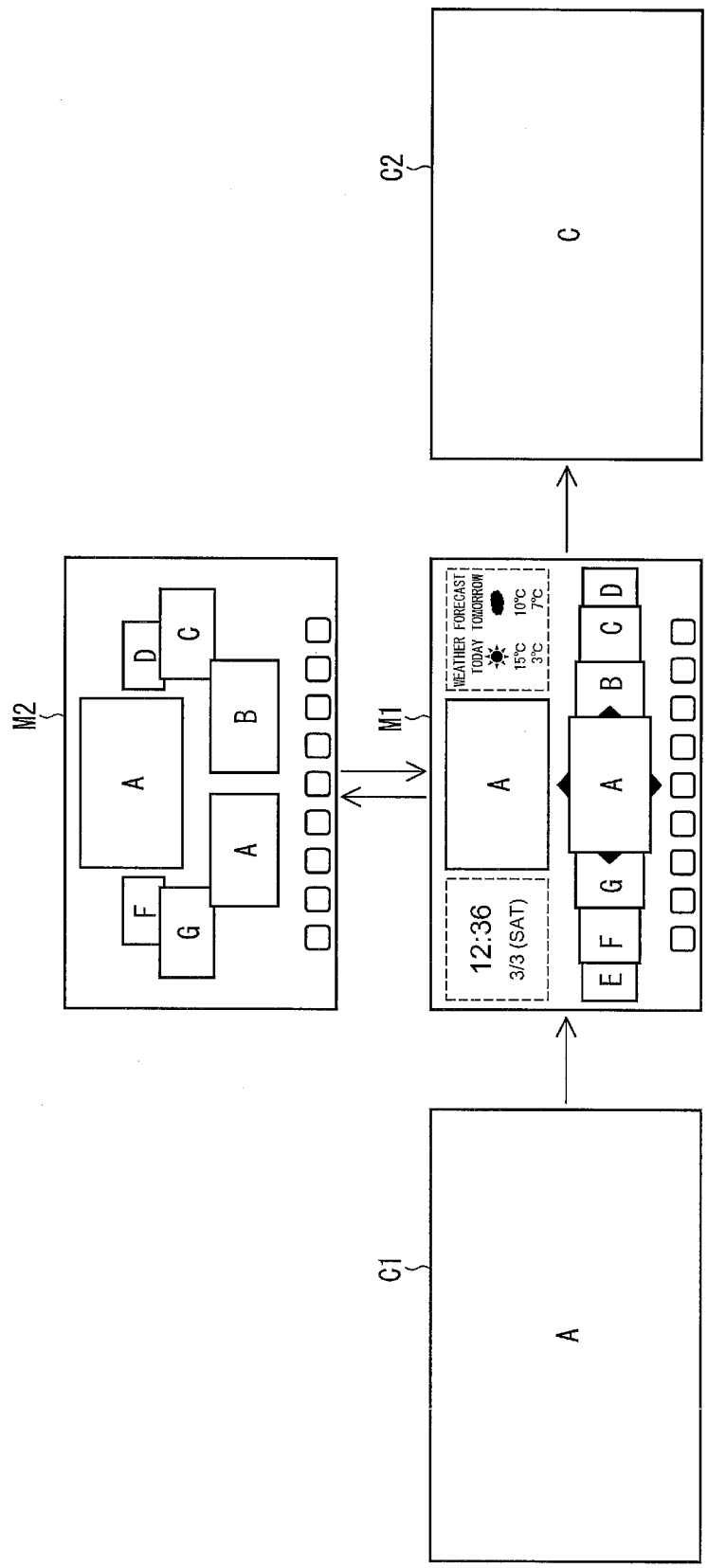
FIG. 2 is a view illustrating a screen change caused in the content display device illustrated in FIG. 1 when a source which supplies content to be displayed is changed.

The following description will discuss, with reference to FIG. 2, a change in screen by switching of the switches SW1 and SW2. FIG. 2 is a view illustrating a change in screen to be displayed on the display section that is incorporated in or connected to the content display device 1. FIG. 2 illustrates a case of a change from a full screen C1 which displays content supplied from the source A to a full screen C2 which displays content supplied from the source C.

The screen change controlling section 13 controls the switch SW2 to select the menu screen generating section 12, when the screen change controlling section 13 receives a remote-control signal while the display section is displaying a full screen of the content supplied from the source A, the remote-control signal indicating that a menu button has been pressed. This causes a screen displayed on the display section to change from the full screen C1 which displays the content supplied from the source A to a first menu screen M1 generated by the menu screen generating section 12.

When the screen change controlling section 13 receives a remote-control signal while the display section is displaying the first menu screen M1, the remote-control signal indicating that a decision button has been pressed, (i) the screen change controlling section 13 controls the switch SW1 to select a source of which the menu screen generating section 12 has notified the screen change controlling section 13 (a source corresponding to a thumbnail image on which a focus is placed on the first menu screen M1), and (ii) the screen change controlling section 13 also controls the switch SW2 to select the switch SW1. For example, in a case where a focus is placed on a thumbnail image Tc corresponding to the source C on the first menu screen M1, the screen displayed on the display section changes from the first menu screen M1 generated by the menu screen generating section 12 to the full screen C2 which displays the content supplied from the source C.

Note that a change in screen between a first menu screen M1 and a second menu screen M2 will be later described with reference to another drawing.

[Configuration of First Menu Screen M1]

Figure 3:
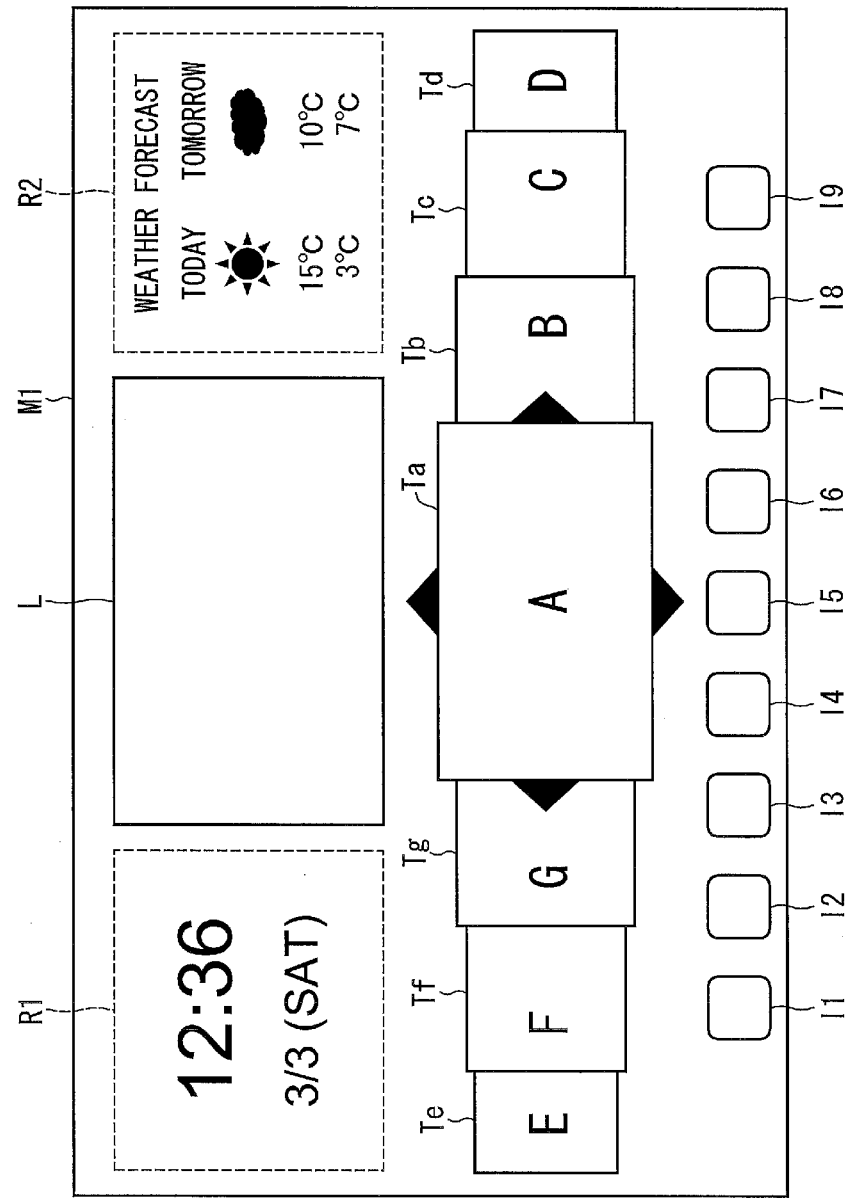
FIG. 3 is a view illustrating a configuration of a first menu screen generated by the content display device illustrated in FIG. 1.

The following description will discuss, with reference to FIG. 3, a configuration of a first menu screen M1 generated by the menu screen generating section 12. FIG. 3 is a view illustrating the configuration of the first menu screen M1.

As illustrated in FIG. 3, the first menu screen M1 is configured to include target content L, N thumbnail images Ta through Tg (where N≥2, N=7 in the present embodiment), nine icons I1 through I9, time information R1, and weather information R2.

The target content L is content which is supplied from a target source selected by the switch SW1 and which is then scaled up or down by the scaling processing section 15. This target content L is located in a central and upper part of the first menu screen M1 (see FIG. 3). Note that, in a case where the target source is a tuner, the target content L is content which is now being broadcasted. In terms of this, the target content L is sometimes called live content.

The thumbnail images Ta through Tg are images corresponding to the respective sources A through G which images are generated by the thumbnail image generating section 11. These thumbnail images Ta through Tg are linearly arranged below the target content L so that the thumbnail image Ta has (i) a right end overlapping with a left end of the thumbnail image Tb which is located on an immediate right of the thumbnail image Ta and (ii) a left end overlapping with a right end of the thumbnail image Tg which is located on an immediate left of the thumbnail image Ta (see FIG. 3). The same applies to the thumbnail images Tb through Tg.

The thumbnail images Ta through Tg are located more forward at locations nearer a center and more backward at locations farther from the center. The thumbnail images Ta through Tg become larger in size at the locations nearer the center, whereas the thumbnail images Ta through Tg become smaller in size at the locations farther from the center. Triangular indicators are added to respective top, bottom, left, and right parts of a thumbnail image located in the center (the thumbnail image Ta in FIG. 3). This makes it possible to notify a user that a focus is placed on the thumbnail image located in the center.

The time information R1 and the weather information R2 are obtained by the real-time information obtaining section 16. The time information R1 includes information on time, a date, and a day of the week, and is located in a blank space on a left side of the target content L (see FIG. 3). The weather information R2 includes information on today's and tomorrow's weathers, maximum temperatures, and minimum temperatures, and is located in a blank space on a right side of the target content L (see FIG. 3).

Each of the icons I1 through I9 is an icon for, example, an application executable by the content display device 1 or a web service available in the content display device 1. The icons I1 through I9 are located in a blank space below the thumbnail images Ta through Tg. Each of the icons I1 through I9 is linked in advance to a select key (such as a first key, a second key, or a third key, which is sometimes called a channel key) of a remote controller. Therefore, a user can start using a desired application or web service merely by pressing a select key linked to the desired application or web service.

Such a configuration where the thumbnail images Ta through Tg are linearly arranged has an advantage of leaving a large blank space in the first menu screen M1. For example, in a case where the thumbnail images Ta through Tg are transversely aligned, it is possible to leave a large blank space at least above or below the thumbnail images Ta through Tg which are transversely aligned. In a case where the thumbnail images Ta through Tg are longitudinally aligned, it is possible to leave a large blank space at least on the left or right of the thumbnail images Ta through Tg which are longitudinally aligned. This blank space can be used to display information useful for a user.

The present embodiment employs a configuration where the thumbnail images Ta through Tg are transversely aligned. This configuration allows large blank spaces to be left respectively above and below the transversely-aligned thumbnail images Ta through Tg. The target content L, the time information R1, and the weather information R2 are located in the blank space above the transversely-aligned thumbnail images Ta through Tg. The icons I1 through I9 are located in the blank space below the transversely-aligned thumbnail images Ta through Tg. Needless to say, it is clear that information, such as the time information R1 and the weather information R2, which is updated in real time is useful for a user.

Figure 4:
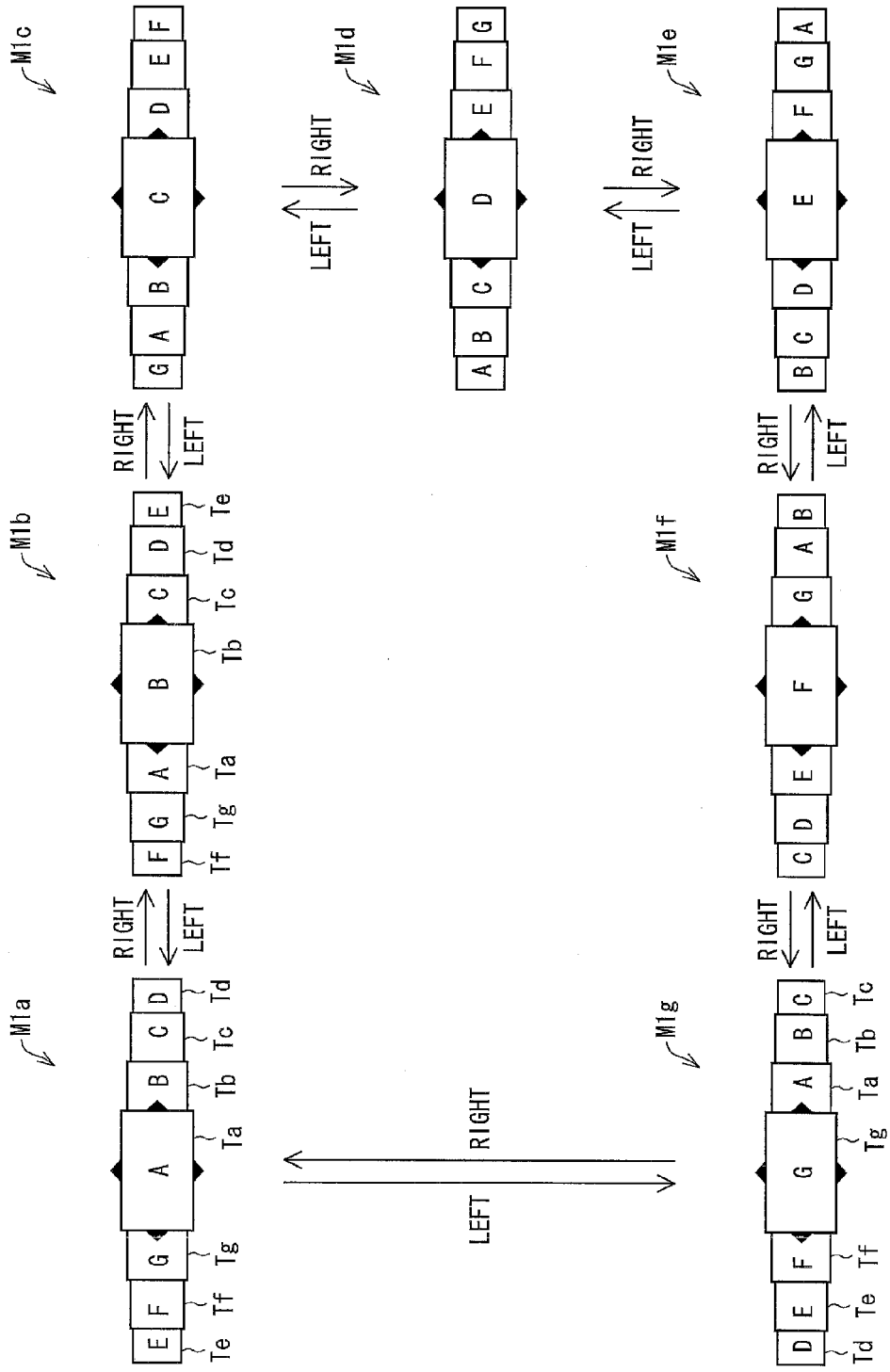
FIG. 4 is a view illustrating how a focus shift is carried out on the first menu screen illustrated in FIG. 3.

A focus shift is carried out on a first menu screen M1 as illustrated in FIG. 4. FIG. 4 is a view illustrating how the focus shift is carried out on the first menu screen M1.

For example, upon reception of a remote-control signal which indicates that a right arrow button of the remote controller has been pressed in a state M1a where a focus is placed on the thumbnail image Ta, the menu screen generating section 12 shifts (i) the thumbnail images Tf, Tg, Ta, Tb, Tc, and Td leftwards and (ii) the thumbnail image Te from a left end to a right end. This causes a thumbnail image on which the focus is placed (the thumbnail image located in the center) to change from the thumbnail image Ta to the thumbnail image Tb which is located on an immediate right of the thumbnail image Ta.

Similarly, upon reception of a remote-control signal which indicates that the right arrow button of the remote controller has been pressed in a state M1b where the focus is placed on the thumbnail image Tb, the menu screen generating section 12 shifts (i) the thumbnail images Tg, Ta, Tb, Tc, Td, and Te leftwards and (ii) the thumbnail image Tf from the left end to the right end. This causes the thumbnail image on which the focus is placed (the thumbnail image located in the center) to change from the thumbnail image Tb to the thumbnail image Tc which is located on an immediate right of the thumbnail image Tb.

In a case where the menu screen generating section 12 receives a remote-control signal which indicates that the right arrow button of the remote controller has been pressed in a state M1c, M1d, M1e, M1f or M1g where the focus is placed on the thumbnail image Tc, Td, Te, Tf or Tg, the menu screen generating section 12 also carries out a focus shift in the same manner as the above-described focus shift.

Upon reception of a remote-control signal which indicates that a left arrow button of the remote controller has been pressed in the state M1a where the focus is placed on the thumbnail image Ta, the menu screen generating section 12 shifts (i) the thumbnail images Tc, Tb, Ta, Tg, Tf, and Te rightwards and (ii) the thumbnail image Td from the right end to the left end. This causes the thumbnail image on which the focus is placed (the thumbnail image located in the center) to change from the thumbnail image Ta to the thumbnail image Tg which is located on an immediate left of the thumbnail image Ta.

Similarly, upon reception of a remote-control signal which indicates that the left arrow button of the remote controller has been pressed in the state M1g where the focus is placed on the thumbnail image Tg, the menu screen generating section 12 shifts (i) the thumbnail images Tb, Ta, Tg, Tf, Te, and Td rightwards and (ii) the thumbnail image Tc from the right end to the left end. This causes the thumbnail image on which the focus is placed (the thumbnail image located in the center) to change from the thumbnail image Tg to the thumbnail image Tf which is located on an immediate left of the thumbnail image Tg.

In a case where the menu screen generating section 12 receives a remote-control signal which indicates that the left arrow button of the remote controller has been pressed in the state M1f, M1e, M1d, M1c or M1b where the focus is placed on the thumbnail image Tf, Te, Td, Tc or Tb, the menu screen generating section 12 also carries out a focus shift in the same manner as the above-described focus shift.

The above has described a configuration where, every time the right arrow button of the remote controller is pressed, a rightward shift of the focus is carried out (the thumbnail images shift leftwards). The configuration is illustrative only. For example, a configuration may be employed in which, while the right arrow button of the remote controller is being pressed, the rightward shift of the focus is sequentially carried out at predetermined time intervals $\Delta t$ (for example, $\Delta t=0.5$ second). With any configuration, the menu screen generating section 12 changes a menu screen to be generated from the first menu screen M1 to a second menu screen M2 when a time period for which the right arrow button of the remote controller is being pressed reaches a predetermined time $\Delta T$ ($\Delta T > \Delta t$, for example, $\Delta T = 2$ seconds).

The above has also described a configuration where, every time the left arrow button of the remote controller is pressed, a leftward shift of the focus is carried out (the thumbnail images shift rightwards). The configuration is illustrative only. For example, a configuration may be employed in which, while the left arrow button of the remote controller is being pressed, the leftward shift of the focus is sequentially carried out at predetermined time intervals $\Delta t$ (for example, $\Delta t=0.5$ second). With any configuration, the menu screen generating section 12 changes the menu screen to be generated from the first menu screen M1 to the second menu screen M2 when a time period for which the left arrow button of the remote controller is being pressed reaches a predetermined time $\Delta T$ ($\Delta T > \Delta t$, for example, $\Delta T=2$ seconds).

[Configuration of Second Menu Screen M2]

The following description will discuss, with reference to FIG. 5, a configuration of a second menu screen M2 generated by the menu screen generating section 12. FIG. 5 is a view illustrating the configuration of the second menu screen M2.

As illustrated in FIG. 5, the second menu screen M2 is configured to include target content L, N ($N \geq 2$, $N=7$ in the present embodiment) thumbnail images Ta through Tg (one of which hides behind the target content L), and nine icons I1 through I9.

Similar to the target content L included in the first menu screen M1, the target content L included in the second menu screen M2 is content which is supplied from a target source selected by the switch SW1 and which is then scaled up or down by the scaling processing section 15. A location of the target content L included in the second menu screen M2 is identical to that of the target content L included in the first menu screen M1.

Similar to the thumbnail images Ta through Tg included in the first menu screen M1, the thumbnail images Ta through Tg included in the second menu screen M2 are images corresponding to the respective sources A through G which images are generated by the thumbnail image generating section 11.

These thumbnail images Ta through Tg included in the second menu screen M2 are circularly arranged so as to surround the target content L in a virtual three-dimensional space represented in the second menu screen M2. The one of the thumbnail images Ta through Tg (the thumbnail image Te in FIG. 5) hides behind the target content L, and therefore is not displayed on the second menu screen M2.

Similar to the icons I1 through I9 included in the first menu screen M1, each of the icons I1 through I9 included in the second menu screen M2 is an icon for, for example, an application executable by the content display device 1 or a web service available in the content display device 1. A location of the icons I1 through I9 included in the second menu screen M2 is identical to that of the icons I1 through I9 included in the first menu screen M1.

Such a configuration where the thumbnail images Ta through Tg are circularly arranged has an advantage of allowing a user to easily understand a cyclic focus shift. That is, for example, in a case where linearly-arranged thumbnail images Ta through Tg shift leftwards so that a thumbnail image on which a focus is placed changes from a first thumbnail image to a second thumbnail image which is located on an immediate right of the first thumbnail image, a user has difficulty understanding that the focus is placed on the thumbnail image Te which is located on a left end next to the thumbnail image Td which is located on a right end (see FIG. 4). On the other hand, the configuration where the thumbnail images Ta through Tg are circularly arranged does not bring a user such difficulty.

The configuration where the thumbnail images Ta through Tg are circularly arranged also has an advantage of giving a larger space for displaying the thumbnail images Ta through Tg as compared with the configuration where the thumbnail images Ta through Tg are linearly arranged. According to, for example, the configuration where the thumbnail images Ta through Tg are linearly arranged, a whole left end of the thumbnail image Tc is covered by the thumbnail image Tb (see M1a in FIG. 4). On the other hand, according to the configuration where the thumbnail images Ta through Tg are circularly arranged, each of the thumbnail images Ta trough Tg is hardly changed in size, and only part of a left end of the thumbnail image Tc is covered by the thumbnail image Tb.

The present embodiment has described a case where seven thumbnail images are simultaneously displayed on the first menu screen M1, and seven thumbnail images (one of which may hide) are simultaneously displayed on the second menu screen M2. The case is illustrative only. That is, more thumbnail images which are visible can be displayed in a case where thumbnail images are circularly arranged, as compared with a case where thumbnail images are linearly arranged. Therefore, for example, in a case where ten sources are selectable, seven of ten thumbnail images corresponding to the respective ten sources may be displayed on the first menu screen M1, whereas all of the ten thumbnail images may be displayed on the second menu screen M2 (a thumbnail image located farther from a focal location may be displayed in a smaller size).

Figure 6:
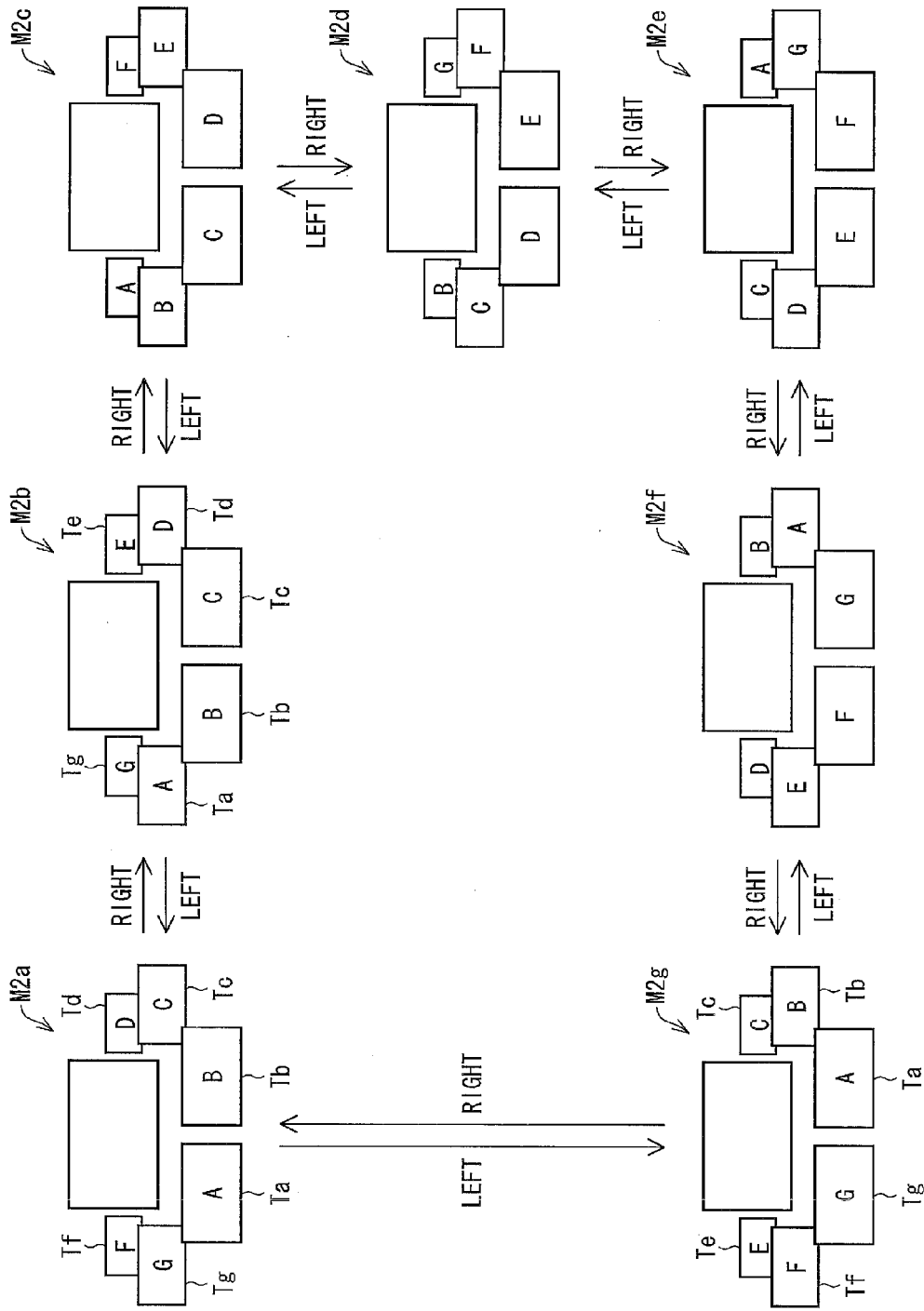
FIG. 6 is a view illustrating how thumbnail images circularly shift on the second menu screen illustrated in FIG. 5.

While the right arrow button or the left arrow button is being pressed, the thumbnail images Ta, Tg, Tf, Te, Td, Tc and Tb rotate around the target content L in the virtual three-dimensional space represented in the second menu screen M2. FIG. 6 illustrates how the thumbnail images Ta, Tg, Tf, Te, Td, Tc and Tb rotate around the target content L in the second menu screen M2. FIG. 6 is a view illustrating how the thumbnail images Ta, Tg, Tf, Te, Td, Tc and Tb circularly shift in the second menu screen M2.

For example, while the right arrow button of the remote controller is being pressed in a state M2a where the thumbnail images Ta and Tb are located most forward, the menu screen generating section 12 shifts the thumbnail images Ta through Tg to respective locations of the thumbnail images Tg, Ta, Tb, Tc, Td, Te, and Tf. This causes the thumbnail image Tf to hide behind the target content L, and causes the thumbnail image Te to become visible on the second menu screen M2.

Similarly, while the right arrow button of the remote controller is being pressed in a state M2b where the thumbnail images Tb and Tc are located most forward, the menu screen generating section 12 shifts the thumbnail images Ta through Tg to the respective locations of the thumbnail images Tg, Ta, Tb, Tc, Td, Te, and Tf. This causes the thumbnail image Tg to hide behind the target content L, and causes the thumbnail image Tf to become visible on the second menu screen M2.

In a case where the right arrow button of the remote controller is being pressed in each of states M2c through M2g where corresponding ones of the thumbnail images Ta through Tg are located most forward, the menu screen generating section 12 also carries out a rotation process in the same manner as the above-described rotation process.

In a case where the left arrow button of the remote controller is being pressed in the state M2a where the thumbnail images Ta and Tb are located most forward, the menu screen generating section 12 shifts the thumbnail images Ta through Tg to the respective locations of the thumbnail images Tb, Tc, Td, Te, Tf, Tg, and Ta. This causes the thumbnail image Td to hide behind the target content L, and causes the thumbnail image Te to become visible on the second menu screen M2.

Similarly, in a case where the left arrow button of the remote controller is being pressed in the state M2g where the thumbnail images Tg and Ta are located most forward, the menu screen generating section 12 shifts the thumbnail images Ta through Tg to the respective locations of the thumbnail images Tb, Tc, Td, Te, Tf, Tg, and Ta. This causes the thumbnail image Tc to hide behind the target content L, and causes the thumbnail image Td to become visible on the second menu screen M2.

In a case where the left arrow button of the remote controller is being pressed in each of the states M2f, M2e, M2d, M2c, and M2b where corresponding ones of the thumbnail images Ta through Tg are located most forward, the menu screen generating section 12 also carries out a rotation process in the above-described rotation process.

Note here that though, for convenience of explanation, the seven states M2a through M2g of the thumbnail images Ta through Tg have been separately explained, the thumbnail images Ta through Tg smoothly rotate around the target content L. That is, the thumbnail images Ta through Tg continuously change their locations, but do not discretely change their locations.

Such a configuration where the circularly-arranged thumbnail images Ta through Tg are rotated around the target content L has an advantage of allowing a user to easily understand (i) a cycle of the thumbnail images Ta through Tg and (ii) complete display of the thumbnail images Ta through Tg (all of the thumbnail images Ta through Tg are displayed).

That is, according to a configuration where linearly-arranged thumbnail images Ta through Tg are shifted in parallel to the linearly-arranged thumbnail images Ta through Tg, one of the thumbnail images which gets out of a first end of a first menu screen M1 should get into the first menu screen M1 via a second end of the first menu screen M1. For example, in a case where a state of the thumbnail images Ta through Tg is changed from the state M1a to the state M1b (see FIG. 4) in response to a pressing of the right arrow button, the thumbnail image Te which gets out of a left end of the first menu screen M1 gets into the first menu screen M1 via a right end of the first menu screen M1. In this case, a user has difficulty understanding that all of the thumbnail images Ta through Tg are displayed. This is because the left end of the first menu screen M1 of which the thumbnail image Te gets out is remarkably away from the right end of the first menu screen M1 via which the thumbnail image Te gets into the first menu screen M1. This makes it difficult for a user to recognize that the total number of the thumbnail images Ta through Tg has not changed.

On the other hand, according to the configuration where the circularly-arranged thumbnail images Ta through Tg are rotated around the target content L, it is unnecessary to cause the thumbnail images Ta through Tg to get out of and get into the second menu screen M2. This does not cause a problem that a user has difficulty understanding that all of the thumbnail images Ta through Tg are displayed. Even in a case where the present embodiment employs a configuration where one of the thumbnail images Ta through Tg hides behind the target content L, each of the thumbnail images Ta through Tg merely shifts from an immediate left (or right) of the target content L to an immediate right (or left) of the target content L via behind the target content L. Therefore, a user can easily understand that all of the thumbnail images Ta through Tg are displayed.

[Change from First Menu Screen M1 to Second Menu Screen M2]

Figure 7:
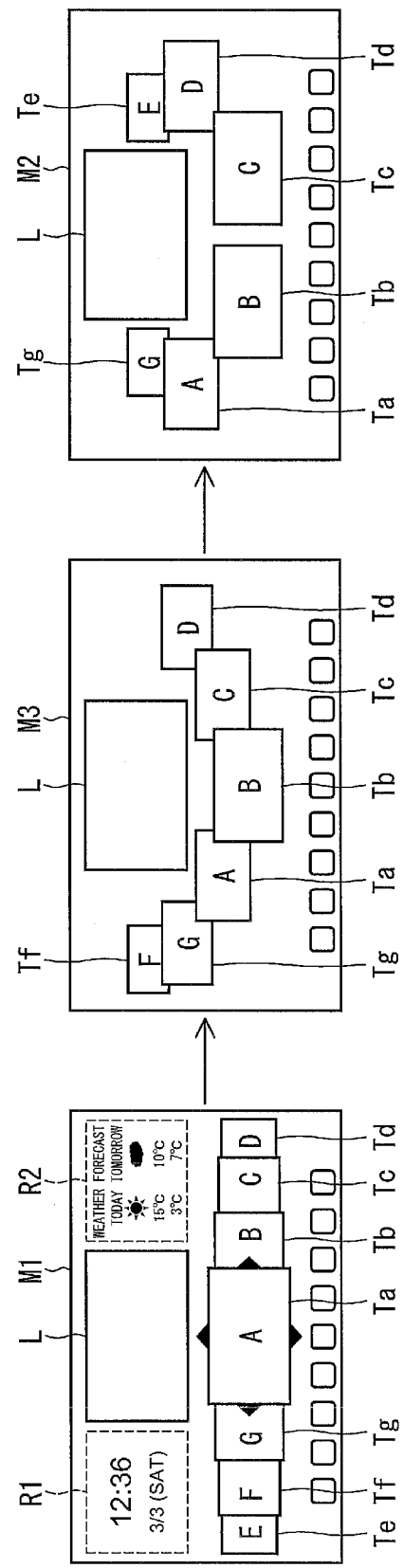
FIG. 7 is a view illustrating a process of a change from the first menu screen illustrated in FIG. 3 to the second menu screen illustrated in FIG. 5.

The following description will discuss, with reference to FIG. 7, a process of a change from a first menu screen M1 to a second menu screen M2. FIG. 7 is a view illustrating the process of the change from the first menu screen M1 to the second menu screen M2. FIG. 7 illustrates an example process of a screen change that is caused in a case where the right arrow button is pressed for a long period while the first menu screen M1 is being displayed. A screen M3 illustrated in a center of FIG. 7 represents an intermediate state between the first menu screen M1 and the second menu screen M2.

When the right arrow button is pressed while the first menu screen M1 is being displayed, the menu screen generating section 12 changes a menu screen from the first menu screen M1 to an intermediate state M3 as follows.

That is, real-time information R1 and real-time information R2 which are not particularly necessary in selecting content are eliminated, and a thumbnail image Te is shifted so as to hide behind target content L. In addition, thumbnail images Tf, Tg, Ta, Tb, Tc, and Td are shifted leftwards, and lifted up, so that the thumbnail images Ta through Tg are substantially circularly arranged.

The menu screen generating section 12 then changes the menu screen from the intermediate state M3 to the second menu screen M2 as follows.

That is, the thumbnail image Tf located on an immediate left of the target content L is shifted so as to hide behind the target content L, and the thumbnail image Te which is behind the target content L is shifted to an immediate right of the target content L so as to be visible. In addition, the thumbnail images Tg, Ta, Tb, Tc, and Td are further shifted, so that the thumbnail images Ta through Tg are circularly arranged.

What should be noted here is that the target content L does not change in location and size in a case where the menu screen is changed from the first menu screen M1 to the second menu screen M2. Since the target content L does not change in location and size, user's viewing and listening to the target content L is neither disturbed nor interrupted in a case where the menu screen is changed from the first menu screen M1 to the second menu screen M2 while the user is viewing and listening to the target content L. Moreover, smoothness of a change from the first menu screen M1 to the second menu screen M2 is not impaired by a scaling process of scaling up or down a target content L which scaling process has a large load.

When a user stops pressing the right arrow button or the left arrow button of the remote controller while the second menu screen M2 is being displayed, the menu screen generating section 12 changes a menu screen to be displayed from the second menu screen M2 to the first menu screen M1. The menu screen is smoothly changed from the second menu screen M2 to the first menu screen M1 in the same manner as a smooth change from the first menu screen M1 to the second menu screen M2. In a case of FIG. 7, when a user stops pressing the right arrow button of the remote controller for a long period, the menu screen is changed from the second menu screen M2 to the first menu screen M1 via the intermediate state M3.

Note that the thumbnail images may be shifted by use of, for example, a jog dial or a touch pad, instead of a single pressing of the right arrow button or the left arrow button of the remote controller (a specific operation, a first user's operation). In a case where the thumbnail images are shifted by use of the jog dial or the touch pad, for example, (i) a clockwise motion of the jog dial or a leftward slide on a touch sensor corresponds to a pressing of the left arrow button of the remote controller, and (ii) continuous rotation of the jog dial or continuous slide on the touch pad corresponds to a long-period pressing of a key of the remote controller.

A user's operation (second user's operation) for changing the menu screen from the first menu screen M1 to the second menu screen M2 is not limited to a long-period pressing of a button, but may be a quick repetitive pressing of a button at a rate exceeding a predetermined threshold, a quick rotation of the jog dial, or a quick slide on the touch pad.

EXAMPLE

The content display device 1 of the present embodiment can be incorporated in, for example, a television receiver. The following description will discuss, with reference to FIGS. 8 and 9, a television receiver 2 in which the content display device 1 of the present embodiment is incorporated.

Figure 8:
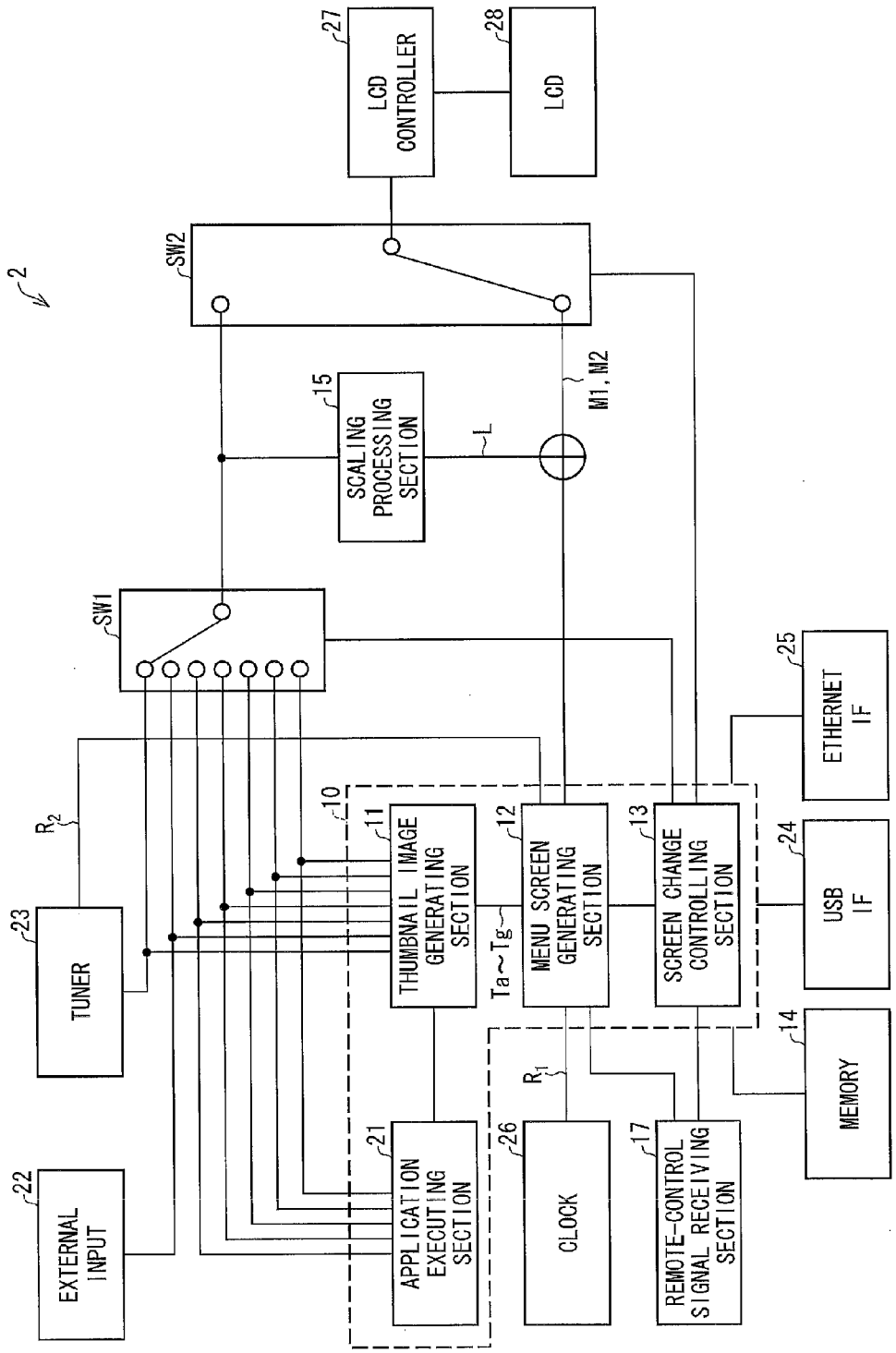
FIG. 8 is a block diagram illustrating a configuration of a television receiver that includes the content display device illustrated in FIG. 1.

FIG. 8 is a block diagram illustrating a configuration of the television receiver 2 of the present Example.

As illustrated in FIG. 8, the television receiver 2 is provided with a CPU 10, a memory 14, a scaling processing section 15, a remote-control signal receiving section 17, a switch SW1, a switch SW2, an external input terminal 22, a tuner 23, a USB interface 24, an Ethernet (Registered Trademark) interface 25, a clock 26, an LCD controller 27, an LCD 28. Note here that the CPU 10 functions as a thumbnail image generating section 11, a menu screen generating section 12, a screen change controlling section 13, and an application executing section 21.

Of blocks of the television receiver 2, the thumbnail image generating section 11, the menu screen generating section 12, the screen change controlling section 13, the memory 14, the scaling processing section 15, the remote-control signal receiving section 17, the switches SW1 and SW2, the tuner 23, and the clock 26 constitute the content display device 1. Note here that the tuner 23 functions as real-time information obtaining means 16 for obtaining weather information from data broadcasting of terrestrial digital broadcasting, and the clock 26 functions as real-time information obtaining means 16 for obtaining time information.

The television receiver 2 provides a user as selectable sources with (i) an external device connected to the external input terminal 22, (ii) the tuner 23, and (iii) an application executable by the application executing section 21. Examples of the application executable by the application executing section 21 include (i) web browser which displays a web page, (ii) a VOD client which reproduces VOD content, and (iii) a USB application for reproducing content stored in a USB memory.

The television receiver 2 informs the LCD controller 27 of a first menu screen M1 or a second menu screen M2 via the switch SW2. By being informed of the first menu screen M1 or the second menu screen M2, the LCD controller 27 controls the LCD 28 to display the first menu screen M1 or the second menu screen M2.

Figure 9:
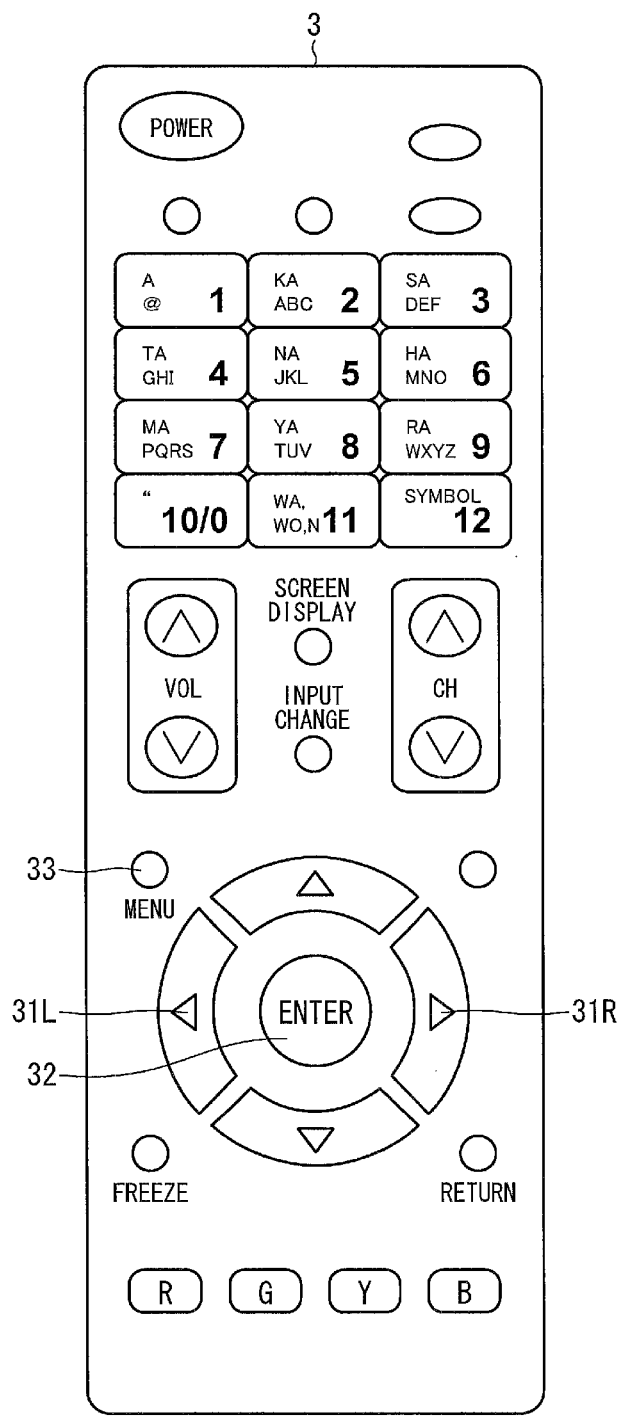
FIG. 9 is a planar view illustrating a configuration of a remote controller which is used to remotely control the television receiver illustrated in FIG. 8.

FIG. 9 is a planar view illustrating a configuration of a remote controller 3 which is used to remotely control the television receiver 2.

The remote controller 3 has a right arrow button 31R, a left arrow button 31L, a decision button 32, and a menu button 33. A user can utilize functions of the content display device 1 by use of these buttons.

The right arrow button 31R is used to shift rightwards, on the first menu screen M1, a thumbnail image on which a focus is placed, In response to a user's long-period pressing of the right arrow button 31R while the first menu screen M1 is being displayed, the television receiver 2 changes the first menu screen M1 to the second menu screen M2, and then clockwise rotates thumbnail images around target content on the second menu screen M2.

The left arrow button 31L is used to shift leftwards, on the first menu screen M1, the thumbnail image on which the focus is placed. In response to a user's long-period pressing of the left arrow button 31L while the first menu screen M1 is being displayed, the television receiver 2 changes the first menu screen M1 to the second menu screen M2, and then counterclockwise rotates the thumbnail images around the target content on the second menu screen M2.

The decision button 32 is used to change a screen from the first menu screen M1 to a full screen. In response to a user's pressing of the decision button 32 while the first menu screen M1 is being displayed, the television receiver 2 starts a full-screen display of content which is supplied from a source corresponding to a thumbnail image on which a focus is placed.

The menu button 33 is used to change the screen from the full screen to the first menu screen M1. In response to a user's pressing of the menu button 33 while the full screen is being displayed, the television receiver 2 starts displaying the first menu screen M1 that includes the content which is being full-screen displayed.

Figure 10:
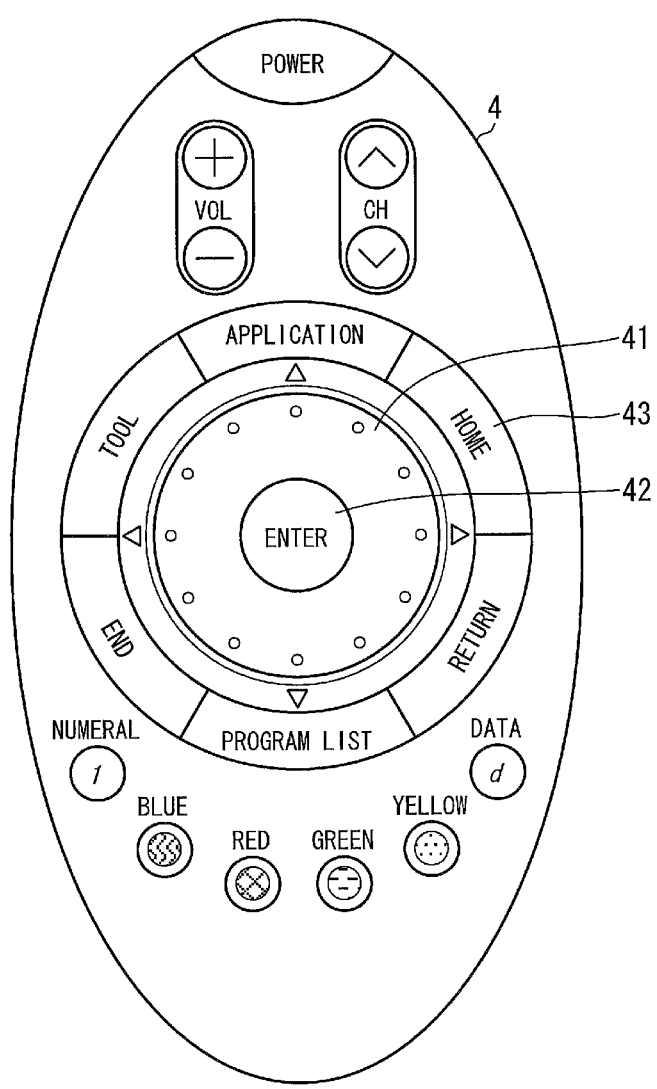
FIG. 10 is a planar view illustrating a configuration of another remote controller which is used to remotely control the television receiver illustrated in FIG. 8.

FIG. 10 is a planar view illustrating a configuration of a remote controller 4 which is used to remotely control the television receiver 2.

The remote controller 4 has a jog dial 41, a decision button 42, and a home button 43. A user can utilize the functions of the content display device 1 by use of these buttons. The remote controller 4 does not have numeric keys corresponding to respective Channels 1 through 12. A user can operate the remote controller 4 more simply than the remote controller 3 (see FIG. 9).

The jog dial 41 is used to carry out a focus shift or a direct channel-selection.

The focus shift is carried out, for example, as follows. That is, when a user rotates the jog dial 41 in a first direction (e.g., clockwise) while the first menu screen M1 is being displayed, the television receiver 2 changes the thumbnail image on which the focus is placed from a first thumbnail image to a second thumbnail image which is located on a right side of the first thumbnail image, accordingly. For example, in response to a rotation of the jog dial 41 by n×30°, the television receiver 2 changes the thumbnail image on which the focus is placed to an $n^{th}$ thumbnail image rightward of the thumbnail image on which the focus is placed. Dots (round marks) with which the jog dial 41 of the remote controller 4 (see FIG. 10) is marked every 30° help a user to accurately change the thumbnail image on which the focus is placed to the $n^{th}$ thumbnail image rightward of the thumbnail image on which the focus is placed.

The above has described a configuration where, in response to the rotation of the jog dial 41 by n×30°, the thumbnail image on which the focus is placed is changed to the $n^{th}$ thumbnail image rightward of the thumbnail image on which the focus is placed. A relation between how much the jog dial 41 is rotated and what number thumbnail image on which a focus is placed is not limited to the configuration. A configuration may be employed in which a user can freely determine how much the jog dial 41 is rotated for each thumbnail image. In a case where a user employs a smart phone as the remote controller 4, the user may change, in accordance with how much the jog dial 41 is rotated for each thumbnail image, which is determined by the user, the number of and intervals of dots with which a virtually-realized jog dial 41 is marked, an image of the virtually-realized jog dial 41 being displayed on a display of the smart phone.

When a user continuously rotates the jog dial 41 by a predetermined degree in the first direction, the television receiver 2 changes a menu screen from the first menu screen M1 to the second menu screen M2. For example, in response to a continuous rotation of the jog dial 41 by 3×360°, the television receiver 2 changes the menu screen from the first menu screen M1 to the second menu screen M2.

The above has described a configuration where, in response to the rotation of the jog dial 41 by 3×360°, the menu screen is changed from the first menu screen M1 to the second menu screen M2. How much the jog dial 41 is rotated so that the menu screen is changed from the first menu screen M1 to the second menu screen M2 is not limited to the configuration. A configuration may be employed in which a user can freely determine how much the jog dial 41 is rotated so that the menu screen is changed from the first menu screen M1 to the second menu screen M2.

Note that the jog dial 41 is configured so that a user can press an upper end of, a lower end of, a left end of, or a right end of the jog dial 41. In response to a user's pressing of the right end of the jog dial 41 of the remote controller 4, the television receiver 2 carries out a focus shift or a screen change which is carried out in response to a user's pressing of the right arrow button 31R of the remote controller 2 (see FIG. 9). In response to a user's pressing of the left end of the jog dial 41 of the remote controller 4, the television receiver 2 carries out a focus shift or a screen change which is carried out in response to a user's pressing of the left arrow button 31L of the remote controller 2 (see FIG. 9).

The direct channel-selection is carried out, for example, as follows. That is, when a user rotates the jog dial 41 in a second direction (e.g., counterclockwise), the television receiver 2 changes a channel received by the tuner 23 to a channel in accordance with how much the jog dial 41 is rotated in the second direction. For example, in response to a rotation of the jog dial 41 by n×30°, the television receiver 2 changes the channel received by the tuner 23 to an $n^{th}$ channel. The dots (round marks) with which the jog dial 41 of the remote controller 4 (see FIG. 10) is marked every 30° help a user to accurately change the channel received by the tuner 23 to the $n^{th}$ channel.

The above has described a configuration where the $n^{th}$ channel is selected in response to the rotation of the jog dial 41 by n×30°. A relation between how much the jog dial 41 is rotated in the second direction and a channel to be selected is not limited to the configuration. For example, a configuration may be employed in which, in response to a rotation of the jog dial 41 n time(s) (by n×360°), the television receiver 2 changes, to the $n^{th}$ channel, the channel received by the tuner 23. Another configuration may be employed in which a user can freely determine how much the jog dial 41 is rotated for each channel (by 30° for each channel in the former paragraph, whereas by 360° for each channel in this paragraph). In a case where a user employs a smart phone as the remote controller 4, the user may change, in accordance with how much the jog dial 41 is rotated for each channel, which is determined by the user, the number of and intervals of dots with which a virtually-realized jog dial 41 is marked, an image of the virtually-realized jog dial 41 being displayed on a display of the smart phone.

In order that a user can further easily understand the direct channel-selection, a configuration may be employed in which the television receiver 2 displays on the LCD 28 how much the jog dial 41 is rotated in the second direction (or a channel or a name of a broadcasting station, which is selected in accordance with how much the jog dial 41 is rotated) while a user is rotating the jog dial 41 in the second direction. For example, the LCD 28 displays "1" (or "Channel 1") for a period of time for which how much the jog dial 41 is rotated has reached one rotation but has not reached two rotations, and displays "2" (or "Channel 2") for a period of time for which how much the jog dial 41 is rotated has reached two rotations but has not reached three rotations.

The above has described a case where the focus shift is carried out in response to a clockwise rotation of the jog dial 41, whereas the direct channel-selection is carried out in response to a counterclockwise rotation of the jog dial 41. The case is illustrative only. That is, a configuration may be employed in which the focus shift is carried out in response to a counterclockwise rotation of the jog dial 41, whereas the direct channel-selection is carried out in response to a clockwise rotation of the jog dial 41. Which rotation direction (clockwise rotation or counterclockwise rotation) is allocated to either of functions (the focus shift or the direct channel-selection) depends on, for example, a user's taste or a user's dominant hand. It is therefore preferable to employ a configuration where a user can change, on a setting screen, which rotation direction (clockwise rotation or counterclockwise rotation) is allocated to either of the functions (the focus shift or the direct channel-selection).

Similar to the decision button 32 of the remote controller 3 (see FIG. 9), the decision button 42 is used to change a screen from a first menu screen M1 to a full screen. In response to a user's pressing of the decision button 42 while the first menu screen M1 is being displayed, the television receiver 2 starts a full-screen display of content which is supplied from a source corresponding to a thumbnail image on which a focus is placed.

Similar to the menu button 33 of the remote controller 3 (see FIG. 9), the home button 43 is used to change the screen from the full screen to the first menu screen M1. In response to a user's pressing of the home button 43 while the full screen is being displayed, the television receiver 2 starts displaying the first menu screen M1 that includes the content which is being full-screen displayed.

The above has described a case where conventional remote controllers are employed as a device for remotely controlling the television receiver 2. The case is illustrative only. For example, a mobile information terminal such as a smart phone may be employed as the device for remotely controlling the television receiver 2.

[Computer and Storage Medium]

Blocks of the content display device 1 may be configured by a hardware logic or may be realized by software as executed by a CPU (Central Processing Unit) as follows.

That is, the content display device 1 includes: a CPU that executes instructions of a control program that realizes the foregoing functions; ROM (Read Only Memory) storing the control program; and RAM (Random Access Memory) that develops the control program; a storage device (storage medium) such as a memory which stores the control program and various kinds of data. The object of the present invention can be achieved, by mounting to the content display device 1 a computer-readable storage medium storing a program code of the control program (executable program, intermediate code program, or source program) for the content display device 1, the control program being software for realizing the foregoing functions, so that the computer (or CPU or MPU) retrieves and executes the program code stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM (Registered Trademark), or flash ROM.

Alternatively, the content display device 1 can be arranged to be connectable to a communications network so that the program code is made available to the content display device 1 via the communications network. The communications network is not limited to a specific one, and therefore can be, for example, the Internet, Intranet, extranet, LAN, ISDN, VAN, CATV communications network, virtual dedicated network (virtual private network), telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that the present invention can also be implemented by the program code in the form of a computer data signal embedded in a carrier wave which is embodied by electronic transmission.

SUMMARY

A content display device (content display device 1) of the present embodiment is configured to display content and include menu screen generating means (menu screen generating section 12) for generating a menu screen on which a user selects content to be displayed from a plurality of pieces of content, in response to a user's operation, the menu screen generating means changing the menu screen to be generated (i) from a first menu screen in which corresponding images corresponding to the respective plurality of pieces of content are linearly arranged (ii) to a second menu screen in which the corresponding images are circularly arranged.

According to the configuration, the corresponding images are linearly arranged in the first menu screen. Therefore, the corresponding images do not occupy a large space in the first menu screen. Various pieces of information etc. can be displayed in a blank space of the first menu screen. Further, according to the configuration, the corresponding images are circularly arranged in the second menu screen. This allows a user to easily grasp all of the plurality of pieces of content. Furthermore, according to the configuration, the menu screen is changed from the first menu screen to the second menu screen in response to a user's operation. This allows a user to be usually notified of various pieces of information which are displayed on the first menu screen, and allows the user to easily grasp all of the plurality of pieces of content by changing as appropriate the menu screen from the first menu screen to the second menu screen.

It is preferable to configure the content display device of the present embodiment so that the menu screen generating means sequentially changes, in response to a specific user's operation, a corresponding image on which a focus is placed on the first menu screen, and the menu screen generating means changes a menu screen to be displayed from the first menu screen to the second menu screen when the specific user's operation continues for a predetermined period of time or longer.

According to the configuration, it is possible to seamlessly cause, due to identical user's operations, (i) a change in a corresponding image on which a focus is placed on the first menu screen and (ii) a change in the menu screen from the first menu screen to the second menu screen.

It is preferable to configure the content display device of the present embodiment so that the menu screen generating means circularly shifts the corresponding images on the second menu screen when the specific user's operation continues.

According to the configuration, it is possible to seamlessly cause, due to identical user's operations, (i) a change in a corresponding image on which a focus is placed on the first menu screen, (ii) a change in the menu screen from the first menu screen to the second menu screen, and (iii) a circular shift of the corresponding images on the second menu screen.

Note that the specific user's operation may be (i) an operation for pressing a right arrow button or a left arrow button of a cross-shaped key of a remote controller which is used to control the content display device or (ii) an operation for rotating a jog dial of a remote controller which is used to control the content display device.

It is preferable to configure the content display device of the present embodiment so that the menu screen generating means sequentially changes, in response to a first user's operation, a corresponding image on which a focus is placed on the first menu screen, and the menu screen generating means changes a menu screen to be displayed from the first menu screen to the second menu screen in response to a second user's operation.

According to the configuration, by carrying out the first user's operation, a user can change the corresponding image on which the focus is placed on the first menu screen. Further, by carrying out the second user's operation, a user can change the menu screen from the first menu screen to the second menu screen.

It is preferable to configure the content display device of the present embodiment so that the menu screen generating means locates, in each of the first menu screen and the second menu screen, content to be displayed which content has been already selected and is scaled down.

According to the configuration, a user can keep viewing and listening to the content to be displayed which content has been already selected, both while the first menu screen is being displayed and while the second menu screen is being displayed.

It is preferable to configure the content display device of the present embodiment so that a location of and a size of the content to be displayed which content has been already selected and is located in the first menu screen are identical to those of the content to be displayed which content has been already selected and is located in the second menu screen.

According to the configuration, a change in the menu screen to be displayed from the first menu screen to the second menu screen does not disturb user's viewing and listening to the content to be displayed which content has been already selected.

It is preferable to configure the content display device of the present embodiment so that the menu screen generating means locates, in the first menu screen, real-time information which is updated in real time.

According to the configuration, it is possible to effectively use a blank space in the first menu screen so as to offer information useful for a user, the blank space being created by linearly arranging the corresponding images.

A menu screen generating method of the present embodiment is configured to be a method of generating, in a content display device which is configured to display content, a menu screen on which a user selects content to be displayed from a plurality of pieces of content, the method including the step of changing, in response to a user's operation, the menu screen to be generated (i) from a first menu screen in which corresponding images corresponding to the respective plurality of pieces of content are linearly arranged (ii) to a second menu screen in which the corresponding images are circularly arranged.

The configuration brings about an effect identical to that brought about by the content display device.

Note that a television receiver (television receiver 2) including the content display device is encompassed in the scope of the present embodiment. Note also that (i) a program for causing a computer to operate as the content display device and (ii) a computer-readable storage medium in which such a program is stored are encompassed in the scope of the present embodiment.

ADDITIONAL DESCRIPTION

The present invention is not limited to the description of the embodiment above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is widely applicable to a content display device, such as a television receiver, which displays a still image and a moving image.

REFERENCE SIGNS LIST

1: Content display device
10: CPU
11: Thumbnail image generating section
12: Menu screen generating section (menu screen generating means)

13: Screen change controlling section
14: Memory
15: Scaling processing section
16: Real-time information obtaining section
17: Remote-control signal receiving section
SW1: Switch
SW2: Switch
2: Television receiver
3: Remote controller

The invention claimed is:

1. A content display device, being configured to display content and comprising:
   a menu screen generating section including circuitry that is configured to generate, as a menu screen on which a user selects content to be displayed from a plurality of pieces of content:
   (i) a first menu screen in which corresponding images corresponding to the respective plurality of pieces of content are linearly arranged, and
   (ii) a second menu screen in which the corresponding images are non-linearly and circularly arranged such that, on the display device, the corresponding images form a circular arrangement in which said corresponding images are arranged radially in multiple directions from a center location,
   the menu screen generating section sequentially changing, in response to a specific user's operation, a corresponding image on which a focus is placed on the first menu screen, and wherein the menu screen generating section:
   changes the menu screen to be generated from the first menu screen to the second menu screen when the image on which focus is placed is sequentially changed at predetermined period of time or longer, wherein said predetermined period of time is an amount more than zero seconds, and
   does not change the menu screen from the first menu screen to the second menu screen when the image on which focus is placed is sequentially changed during a time interval that is more than zero seconds but less than said predetermined period of time.

2. The content display device as set forth in claim 1, wherein the menu screen generating section circularly shifts the corresponding images on the second menu screen when the specific user's operation continues.

3. The content display device as set forth in claim 2, wherein the specific user's operation is an operation for pressing a right arrow button or a left arrow button of a cross-shaped key of a remote controller which is used to control the content display device.

4. The content display device as set forth in claim 2, wherein the specific user's operation is an operation for rotating a jog dial of a remote controller which is used to control the content display device.

5. The content display device as set forth in claim 1, wherein the menu screen generating section locates, in each of the first menu screen and the second menu screen, content to be displayed which content has been already selected and is scaled down.

6. The content display device as set forth in claim 5, wherein a location of and a size of the content to be displayed which content has been already selected and is located in the first menu screen are identical to those of the content to be displayed which content has been already selected and is located in the second menu screen.

7. The content display device as set forth in claim 1, wherein the menu screen generating section locates, in the first menu screen, real-time information which is updated in real time.

8. A television receiver, comprising a content display device as set forth in claim 1.

9. A method of generating, in a content display device which is configured to display content, as a menu screen on which a user selects content to be displayed from a plurality of pieces of content:
   (i) a first menu screen in which corresponding images corresponding to the respective plurality of pieces of content are linearly arranged, and
   (ii) a second menu screen in which the corresponding images are non-linearly and circularly arranged such that, on the display device, the corresponding images form a circular arrangement in which said corresponding images are arranged radially in multiple directions from a center location,
   the method comprising:
   sequentially changing, in response to a specific user's operation, a corresponding image on which a focus is placed on the first menu screen; and
   changing the menu screen to be generated from the first menu screen to the second menu screen when the image on which focus is placed is sequentially changed at predetermined period of time or longer, wherein said predetermined period of time is an amount more than zero seconds, but not changing the menu screen from the first menu screen to the second menu screen when the image on which focus is placed is sequentially changed during a time interval that is more than zero seconds but less than said predetermined period of time.

10. A non-transitory computer-readable storage medium in which a program for causing a computer to operate as a content display device as set forth in claim 1 is stored, wherein the program when executed causes the computer to function as the menu screen generating section.

* * * * *